United States Patent
Clark et al.

(10) Patent No.: US 9,395,514 B2
(45) Date of Patent: Jul. 19, 2016

(54) PYRAMIDAL SPACE FRAME AND ASSOCIATED METHODS

(71) Applicant: SKYFUEL, INC., Arvada, CO (US)

(72) Inventors: Ryan Michael Clark, Golden, CO (US); David White, Denver, CO (US); Adrian Lawrence Farr, Jr., Littleton, CO (US)

(73) Assignee: SKYFUEL, INC., Lakewood, CO (US)

( * ) Notice: Subject to any disclaimer, the term of this patent is extended or adjusted under 35 U.S.C. 154(b) by 51 days.

(21) Appl. No.: 14/531,803

(22) Filed: Nov. 3, 2014

(65) Prior Publication Data

US 2015/0124344 A1 May 7, 2015

Related U.S. Application Data

(60) Provisional application No. 61/899,636, filed on Nov. 4, 2013.

(51) Int. Cl.
*G02B 7/183* (2006.01)

(52) U.S. Cl.
CPC ..................................... *G02B 7/183* (2013.01)

(58) Field of Classification Search
CPC ........... G01B 11/26; F24J 2/10; F24J 2/1047; F24J 2/12; F24J 2/541; Y02E 10/47; Y02E 10/45
USPC ........... 126/569, 683–688, 690, 696; 359/853
See application file for complete search history.

(56) References Cited

U.S. PATENT DOCUMENTS

| | | | |
|---|---|---|---|
| 4,214,409 | A | 7/1980 | Gebhardt et al. |
| D352,557 | S | 11/1994 | Hing |
| 6,021,795 | A | 2/2000 | Long et al. |
| 6,996,941 | B1 | 2/2006 | Maschoff |
| 7,950,386 | B2 | 5/2011 | Le Lievre |
| 8,071,930 | B2 | 12/2011 | Wylie et al. |
| 8,615,960 | B2 | 12/2013 | Marcotte et al. |
| 2005/0081904 | A1 | 4/2005 | Suzuki et al. |
| 2006/0157050 | A1 | 7/2006 | Le Lievre |
| 2008/0127595 | A1 | 6/2008 | Reynolds et al. |
| 2008/0308094 | A1 | 12/2008 | Johnston et al. |

(Continued)

FOREIGN PATENT DOCUMENTS

| | | |
|---|---|---|
| WO | WO 2009/043955 | 4/2009 |
| WO | WO 2010/024891 | 3/2010 |

(Continued)

*Primary Examiner* — Jennifer L. Doak
(74) *Attorney, Agent, or Firm* — Lathrop & Gage LLP

(57) ABSTRACT

A space frame having a high torsional strength comprising a first square bipyramid and two planar structures extending outward from an apex of the first square bipyramid to form a "V" shape is disclosed. Some embodiments comprise a plurality of edge-sharing square bipyramids configured linearly, where the two planar structures contact apexes of all the square bipyramids. A plurality of bridging struts, apex struts, corner struts and optional internal bracing struts increase the strength and rigidity of the space frame. In an embodiment, the space frame supports a solar reflector, such as a parabolic solar reflector. Methods of fabricating and using the space frames are also disclosed.

9 Claims, 7 Drawing Sheets

(56) References Cited

U.S. PATENT DOCUMENTS

| | | |
|---|---|---|
| 2009/0277440 A1 | 11/2009 | Angel et al. |
| 2010/0043776 A1 | 2/2010 | Gee |
| 2010/0058703 A1 | 3/2010 | Werner et al. |
| 2010/0161061 A1 | 6/2010 | Hunt |
| 2010/0206303 A1 | 8/2010 | Thorne |
| 2010/0208375 A1 | 8/2010 | Albisu Tristan et al. |
| 2010/0258702 A1 | 10/2010 | Werner et al. |
| 2011/0108091 A1 | 5/2011 | Wylie et al. |
| 2011/0157733 A1 | 6/2011 | Werner et al. |
| 2012/0217209 A1 | 8/2012 | Marcotte et al. |
| 2013/0220950 A1* | 8/2013 | Gilabert .............. F24J 2/14 211/13.1 |
| 2014/0020677 A1* | 1/2014 | Dominguez Abascal .......... F24J 2/5233 126/696 |
| 2014/0144428 A1 | 5/2014 | Eisinger et al. |
| 2014/0182580 A1 | 7/2014 | Marcotte et al. |

FOREIGN PATENT DOCUMENTS

| | | |
|---|---|---|
| WO | WO 2011/161275 | 12/2011 |
| WO | WO 2012/021993 | 2/2012 |

* cited by examiner

PYRAMIDAL SPACE FRAME AND ASSOCIATED METHODS

CROSS-REFERENCE TO RELATED APPLICATIONS

This application claims the benefit of priority from U.S. Provisional Patent Application No. 61/899,636, filed Nov. 4, 2013, which is hereby incorporated by reference in its entirety.

GOVERNMENT RIGHTS

This invention was made with government support from the Department of Energy under contract no. DE-EE0003584. The U.S. government has certain rights in this invention.

BACKGROUND

An aluminum space frame accounts for nearly 25% of the total installation cost of a parabolic trough concentrating solar power (CSP) system, and, therefore, reduction in space frame costs can result in significant savings for a solar project. A reduction of space frame cost can be recognized either in reduction of material (e.g., lighter frames), reduction in manufacturing costs or reduction in installation cost. Because of the size of many large solar thermal installations, the space frames are often thought of as a commodity, and reduction in materials becomes the dominant factor. This does not imply that all components of the frame reduce in size, but rather that there is a net reduction in material used. Reduction in material can be thought of in terms of a net reduction in mass or weight of construction materials or a net reduction in volume of materials required (in cubic space units, such as in$^3$). For a given material the net volume can be equated to a net mass by the following ratio:

$$\text{mass}_n = r_n * V_n$$

where r is density and V is volume of material. If the frame is fabricated from more than one material type, the cost reduction can be determined by the equation:

$$\text{cost}_{total} = \Sigma_{n=1}{}^n \text{Volume}_n * r_n * \text{specific cost}_n.$$

Additionally, increasing the aperture area of a parabolic trough concentrator can decrease overall system costs, but when traditional space frames are scaled to accept large aperture mirrors (e.g., apertures greater than 5.7 meters or 6 meters), the space frame depth must increase to maintain torsional stiffness. But as the space frame increases in depth, the struts become longer making them more susceptible to buckling mode failure.

Critical buckling load is typically defined using Euler buckling, which is a theoretical maximum load that an initially straight column can support without buckling and is given by the equation:

$$F_e = \frac{pi^2 * E * A}{\left(\frac{L}{k}\right)^2},$$

or expressed as a stress:

$$s_b = \frac{F_e}{A}$$

$$s_b = \frac{pi^2 * E}{\left(\frac{L}{k}\right)^2}$$

where $F_e$ is the critical bucking load, E is Young's modulus (a material specific property), A is the cross sectional area of the column, L is the unbraced length of the member, and k is the radius of gyration, which is given by:

$$k = \sqrt{\frac{I}{A}}$$

where I is the area moment of inertia and A is the cross sectional area. In the equation above, both the L and k terms are geometric variables that directly affect the material volume required for a space frame.

By way of example, patent documents describing various space frame designs include, for example, U.S. Pat. Pub. Nos. US 2014/0144428, US 2014/0182580, US 2012/0217209, US 2010/0043776, US 2010/0258702, US 2010/0058703, US 2011/0157733, US 2008/0127595, US 2010/0206303, US 2009/0277440 and US 2008/0308094; U.S. Pat. Nos. 8,615,960, 8,071,930 and 7,950,386; and International Patent App. No. PCT/US2009/04852, each of which is hereby incorporated by reference to the extent not inconsistent herewith.

SUMMARY

Solar thermal collectors (i.e., parabolic solar collectors) rely heavily on optical precision to achieve the required or necessary efficiencies to be competitive with other forms of renewable energies. In the case of parabolic collectors, mirror shape, location of the receiver relative to the parabolic focal point, and distortion of the frame under operating conditions is critical to the performance of the collector. In many collectors, the ribs define the "shape of the mirror" and the receiver supports define the location of the receiver relative to the mirror surface. The mirror frame provides the support system for those ribs and receiver supports, and so defines the amount of efficiency loss due to frame distortion during operating conditions. This distortion includes displacements in response to loads from thermal expansion, assembly, tracking drives, gravity and wind, as well as loads imposed by adjacent frames subject to similar loads.

The present space frame is a structure designed for use in parabolic trough concentrating solar power (CSP) applications to transfer loads to ground, provide a tracking platform, and support receivers, ribs and mirrors while minimizing efficiency loss due to distortion. The pyramidal space frame provides a space frame geometry where for any given aperture width the overall weight of the frame decreases while maintaining the torsional stiffness of the frame when compared to a traditional "flat bottom truss" space frame. This has been achieved by modifying the geometry of the space frame whereby the cross section forms a diamond shape with two outlying triangles that form the support for the outer rim of the parabolic mirror. The frame is designed such that for each strut within the frame the ratio of $F_{cr}$ to $$F_{actual}\left(\frac{F_{cr}}{F_{actual}}\right)$$

approaches 1, where $F_{cr}$ is the critical buckling stress and $F_{actual}$ is the actual stress in the member. This pyramidal space frame geometry enables the effective frame depth to increase while the most heavily loaded struts within the frame do not significantly increase in length or in some cases decrease in length. This is significant because, as noted above, the critical buckling stress is inversely proportional to the ratio of the length to the radius of gyration squared ($F_{cr} \propto 1/((L/k)^2)$), where radius of gyration is a function of the area moment of inertia and the cross sectional area, $k=\sqrt{(I/A)}$. Thus, the geometry of the pyramidal space frame allows for the use of relatively short struts that maintain a high critical buckling stress while simultaneously reducing the material cost of the space frame and supporting a large aperture reflector.

By controlling the length of the most heavily loaded struts, the space frame geometry described herein provides a lower cost than previous designs scaled to an appropriate size for large aperture (5.7 meters or 6 meters or greater) concentrators. The cost savings in the space frame are realized by reconfiguring the planar bottom truss to an out-of-plane pyramidal space truss, as shown in FIG. 7. This allows an increase in space frame depth without a significant increase in length of the truss members, which translates into cost savings associated with reducing the weight of the space frame per unit aperture area.

In an embodiment, a space frame device or method achieves an advantageous reduction in material while providing a light, yet strong, space frame.

In an aspect, a space frame comprises a first square bipyramid and two planar structures extending outward from an apex of the first square bipyramid to form a "V" shape. For example, the "V" shape may have an internal angle selected from the range of 110 degrees to 170 degrees, or 120 degrees to 160 degrees, or 130 degrees to 150 degrees.

In an embodiment, an aperture of the "V" shape is selected from the range of 1 meter to 12 meters, or from 3 meters to 10 meters, or from 5 meters to 9 meters, or from 6 meters to 8 meters. In an embodiment, an aperture of the "V" shape is at least 3 meters, or at least 5 meters, or at least 6 meters, or at least 8 meters, or at least 9 meters, or at least 10 meters.

In an embodiment, a depth of the space frame is selected from the range of 1 meter to 8 meters, or 1 meter to 6.5 meters, or 3.5 meters to 6.5 meters, or 3 meters to 5 meters, or 4 meters to 6.5 meters.

In an embodiment, a ratio of an aperture of the "V" shape to a depth of the space frame is selected from 1.25 to 4.25, or from 1.75 to 3.75, or from 2.0 to 3.5, or from 2.25 to 3.25, or from 2.5 to 3. In an embodiment a ratio of an aperture of the "V" shape to a depth of the space frame is at least 1.25, or at least 1.75, or at least 2.0, or at least 2.25, or at least 2.5.

In an embodiment, the space frame comprises a second square bipyramid that is edge-sharing with the first square bipyramid, wherein the two planar "V" structures contact both the apex of the first square bipyramid and an apex of the second square bipyramid.

In an embodiment, the space frame comprises a plurality of edge-sharing square bipyramids configured linearly with each other and with the first square bipyramid, wherein the two planar "V" structures contact apexes of all the square bipyramids.

In an embodiment, the space frame comprises at least one bridging strut connecting a node, disposed along a cross-sectional mid-point of at least one of the plurality of edge-sharing square bipyramids and at a top edge of at least one of the planar structures, to the apex of a neighboring square bipyramid.

In an embodiment, the space frame comprises a plurality of corner struts connecting a node, disposed along a cross-sectional mid-point of the square bipyramid and at a top edge of each of the planar structures, to corners of the square bipyramid.

In an embodiment, the square bipyramid of the space frame comprises one or more internal bracing struts.

In an embodiment, the space frame comprises a solar reflector disposed within the "V" shape formed by the two planar structures. For example, the solar reflector may be a parabolic solar reflector, such as a single, contiguous solar reflector.

In an embodiment, the space frame comprises a pair of torque plates supporting the space frame.

In an embodiment, at least one of the main chord, the top chords, the apex struts, the corner struts and the bridging struts is fabricated from a material selected from the group consisting of aluminum, steel, carbon fiber, titanium and polymers.

In an aspect, a space frame comprises a plurality of edge-sharing octahedra configured linearly, wherein each octahedron comprises an apex at a node on a main chord and two longitudinal top chords disposed above the octahedra, wherein the top chords are connected to the octahedra by apex struts joining nodes on the top chords to the nodes on the main chord and by corner struts joining the nodes on the top chords to nodes at each corner of each octahedron.

In an embodiment, the space frame comprises bridging struts joining the nodes on the top chords to the nodes on the main chord corresponding to the apexes of neighboring octahedra.

In an embodiment, non-shared edges of the octahedra are formed by two longitudinal edge chords.

In an embodiment, each octahedron of the space frame comprises one or more internal bracing struts.

In an embodiment, the space frame comprises a solar reflector disposed within a "V" shape formed by the main chord and the top chords.

In an aspect, a concentrating solar power (CSP) system comprises a space frame comprising a first square bipyramid and two planar structures extending outward from an apex of the first square bipyramid to form a "V" shape; and a parabolic solar reflector disposed within the "V" shape formed by the two planar structures. In this configuration, the space frame is behind the parabolic solar reflector when viewed from the perspective of the sun, and the vertex of the parabolic solar reflector is pointed toward the apex of the first square bipyramid.

In an aspect, a concentrating solar power (CSP) system comprises a space frame comprising a plurality of edge-sharing octahedra configured linearly, wherein each octahedron comprises an apex at a node on a main chord; and two longitudinal top chords disposed above the octahedra, wherein the top chords are connected to the octahedra by apex struts joining nodes on the top chords to the nodes on the main chord and by corner struts joining the nodes on the top chords to nodes at each corner of each octahedron; and a parabolic solar reflector disposed within the "V" shape formed by the main chord and the top chords.

In an aspect, a concentrating solar power (CSP) system comprises a diamond-shaped cross section and a pair of wings, wherein each of the wings extends from a top portion of the diamond; and wherein an apex of the diamond is pointed toward a vertex of a parabolic solar concentrator.

In an aspect, a method of fabricating a space frame comprises: providing a plurality of edge-sharing octahedra configured linearly, wherein each octahedron comprises an apex at a node on a main chord; and providing two longitudinal top chords above the octahedra, wherein the top chords are connected to the octahedra by apex struts joining nodes on the top chords to the nodes on the main chord and by corner struts joining the nodes on the top chords to nodes at each corner of each octahedron.

In an aspect, a method of using a space frame to support a parabolic trough solar concentrating power system comprises: providing a plurality of edge-sharing octahedra configured linearly, wherein each octahedron comprises an apex at a node on a main chord; providing two longitudinal top chords above the octahedra, wherein the top chords are connected to the octahedra by apex struts joining nodes on the top chords to the nodes on the main chord and by corner struts joining the nodes on the top chords to nodes at each corner of each octahedron; and providing a solar reflector within a "V" shape formed by the main chord and the top chords.

In an embodiment, the method comprises a step of providing a pair of torque plates, wherein each torque plate is arranged at an end of the linear configuration to support the space frame.

In an aspect, a space frame has an out-of-plane bottom truss, wherein a ratio of half the length of the base strut of the space frame to a length of the side strut of the space frame is selected from a range of 1.1 to 0.7, or selected from a range of 1.0 to 0.8, or selected from a range of 0.95 to 0.85, or is 0.9. Table 1 provides typical lengths for a base strut covering half the length of the base, $L_{0.5B}$, and a side strut, L. See FIGS. 10A and 10B. A range of acceptable lengths for these struts in a space frame of a given aperture is shown within Table 1 in parentheses, and a specific preferred length is shown outside the parentheses.

TABLE 1

| Collector Aperture (ft) | ½ Length of Base Strut (in) | Side Strut Length (in) |
| --- | --- | --- |
| 6 | (100-125) 114 | (115-135) 125 |
| 7 | (120-145) 133 | (135-155) 146 |
| 7.66 | (130-160) 146 | (150-170) 160 |
| 8 | (135-165) 152 | (155-175) 167 |
| 8.5 | (150-170) 162 | (165-185) 177 |
| 9 | (160-180) 172 | (180-200) 188 |
| 10 | (180-200) 190 | (200-220) 209 |

In an aspect, a space frame comprises a diamond-shaped cross section and a pair of wings, wherein each of the wings extends from and is edge-sharing with a top of the diamond. In an embodiment, an apex of the diamond is pointed toward a vertex of a solar concentrator. For example, the solar concentrator may be parabolic.

In an embodiment, a space frame has an out-of-plane bottom truss, with the longest strut of the space frame having a length as shown in Table 2. The longest strut in a space frame of the present design is typically a bridging strut (e.g., FIG. 5, 500). A range of acceptable lengths for the longest strut in a space frame of a given aperture is shown in parentheses, and a specific preferred length is shown outside the parentheses.

TABLE 2

| Collector Aperture (ft) | Longest Strut Length (in) |
| --- | --- |
| 6 | (170-196) 181 |
| 7 | (190-220) 211 |
| 7.66 | (205-240) 231 |
| 8 | (225-250) 241 |
| 8.5 | (235-270) 256 |
| 9 | (260-290) 271 |
| 10 | (290-315) 302 |

In an embodiment, a space frame has an out-of-plane bottom truss, wherein total deflection of the space frame from an ideal focal position is limited to less than $2.5 \times 10^{-2}$ mRad/m. The present frame has been designed to limit deflection, for example, to the values shown in Table 3.

TABLE 3

| | Total deflection (mRad/m) | |
| --- | --- | --- |
| Aperture | 80 mm receiver | 90 mm receiver |
| 7 | 2.51E−2 | 2.54E−2 |
| 7.5 | 2.10E−2 | 2.14E−2 |
| 8 | 1.98E−2 | 2.01E−2 |
| 9 | 1.95E−2 | 1.98E−2 |
| 10 | 1.75E−2 | 1.77E−2 |

The values presented in Table 3 are based on a total deflection due to both torsional wind up, collector dead load and receiver dead load, which is shown in two columns for different sized receivers. These results represent a 4 bay module having 4 receivers, but analysis shows that similar results can be achieved for 3 bay and 5 bay modules.

DETAILED DESCRIPTION

Figure 1A:
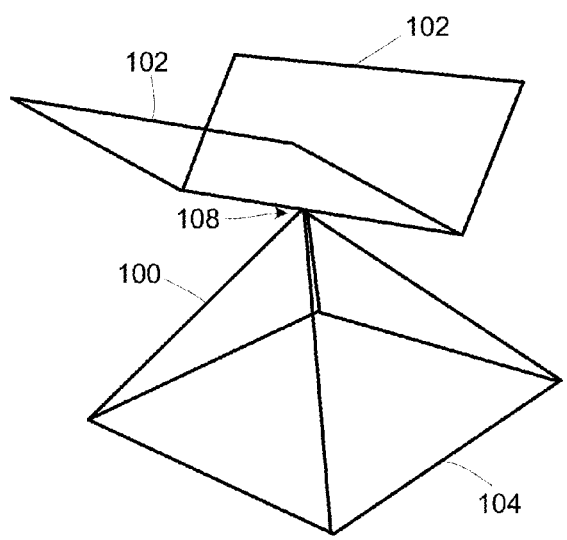
FIG. 1A shows a top perspective view of a space frame comprising a square pyramid having two planar structures extending from an apex of the pyramid in a V-shape, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, a "square pyramid" is a structure having a square or rectangular base and four triangular faces extending from the base and meeting at an apex.

As used herein, a "square bipyramid" is a structure having a square or rectangular portion and four triangular faces extending from the base in a first direction and meeting at a first apex, to form a first square pyramid, and four additional triangular faces extending from the base in a second direction and meeting at a second apex, to form a second square pyramid. A square bipyramid is a combination of two base-sharing square pyramids. The terms square bipyramid and octahedron may be used interchangeably.

As used herein, "edge-sharing" pyramids or bipyramids are in direct or indirect contact only along a one-dimensional edge or line. For example, a single strut or chord may form an edge section for two "edge-sharing" pyramids or bipyramids.

As used herein, a "face-sharing" pyramid or bipyramid has at least one planar, two-dimensional surface aligned with and in direct or indirect contact with a planar, two-dimensional surface from at least one other pyramid or bipyramid. For example, three struts or chords that form a triangular face of a first pyramid or bipyramid may also form a triangular face of a second "face-sharing" pyramid or bipyramid.

An "apparatus" is a combination of components operably connected to produce one or more desired functions.

A "component" is used broadly to refer to an individual part of an apparatus.

"Modular" refers to an object constructed of multiple units or components. A modular apparatus, for example, is an apparatus that may be disassembled into a plurality of components and optionally reassembled.

A "node" refers to a connector or hub where two or more components meet. A node may, for example, indirectly join two or more components of an apparatus, and orient the two or more components at selected positions and angles relative to one another.

A "V" shape refers to two elements or components that come together (e.g., at a node) to form an angle. In an embodiment, the elements or components that form the "V" shape are substantially planar with a maximum deviation from their respective planes equal to or less than 5 degrees, 2 degrees, 1 degree, 0.5 degrees or 0.2 degrees. In an embodiment, the elements or components that form the "V" shape are absolutely planar (i.e., deviation=0 degrees).

"Alignment" is used herein to refer to the relative arrangement or position of surfaces, objects or components.

"Substantially stationary" refers to an object that moves or rotates less than 5%, or less than 3%, or less than 1% relative to an original starting position.

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications. Polymers useable in the apparatus and components described herein include, but are not limited to, plastics, elastomers, thermoplastic elastomers, elastoplastics, thermoplastics and acrylates.

"Contiguous" refers to materials or layers that are touching or connected throughout in an unbroken sequence. A contiguous object may be a monolithic object.

"Unitary" refers to an object formed as a single piece or undivided whole.

The terms "direct and indirect" describe the actions or physical positions of one component relative to another component, or one apparatus relative to another apparatus. For example, a component that "directly" acts upon or touches another component does so without intervention from an intermediary. Contrarily, a component that "indirectly" acts upon or touches another component does so through an intermediary (e.g., a third component).

Space frames and associated methods will now be described with reference to the figures.

A space frame is generally an open structure formed by struts, chords or the like. The struts and chords may be circular, oval, triangular, square, rectangular, hexagonal or irregularly shaped in their cross sectional profile, and the cross sectional profile may vary along the length of a strut or chord. The faces of the space frame and the planar structures typically comprise void space, but in some embodiments the faces of the space frame and/or planar structures may be at least partially occupied by a material, e.g., such as by additional struts, reflective material, mirrors or other materials.

In an embodiment, a space frame is modular, and may be disassembled into a plurality of components and reassembled.

Figure 1B:
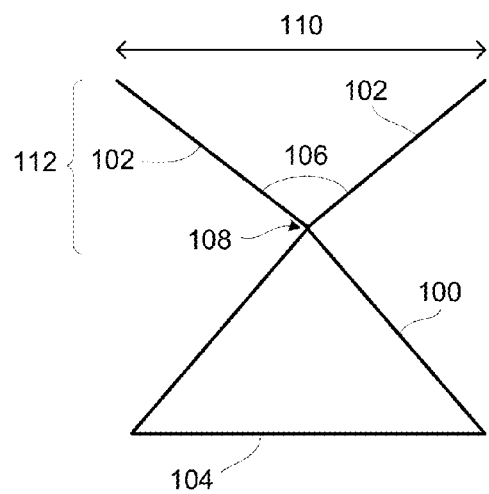
FIG. 1B shows a side plan view of the space frame shown in FIG. 1A.

FIGS. 1A and 1B show a top perspective view and a side plan view, respectively, of a space frame comprising a square pyramid 100 having two planar structures 102 extending from an apex 108 of the pyramid in a V-shape 112 having an internal angle 106 and an aperture 110, according to an embodiment. An edge 104 of the pyramid may be shared or joined with other pyramids or bipyramids.

Figure 2A:
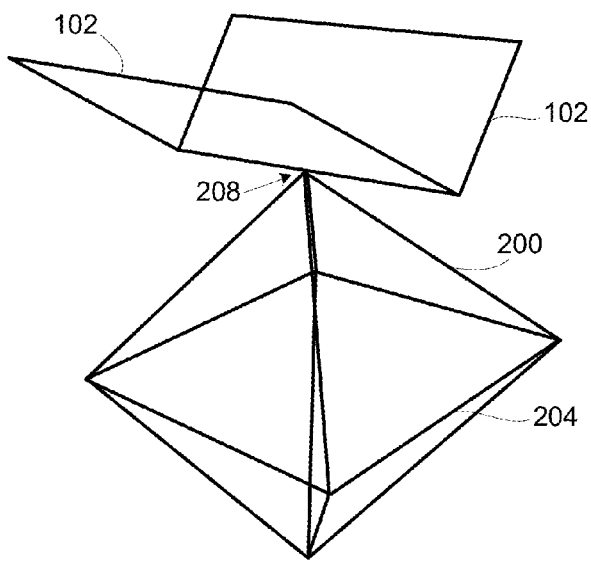
FIG. 2A shows a top perspective view of a space frame comprising a square bipyramid having two planar structures extending from an apex of the bipyramid in a V-shape, according to an embodiment.
Figure 2B:
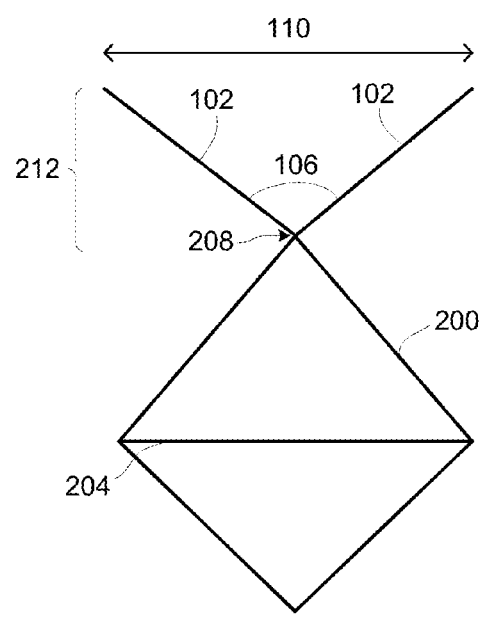
FIG. 2B shows a side plan view of the space frame shown in FIG. 2A.

FIGS. 2A and 2B show a top perspective view and a side plan view, respectively, of a space frame comprising a square bipyramid 200 having two planar structures 102 extending from an apex 208 of the bipyramid 200 in a V-shape 212 having an internal angle 106 and an aperture 110, according to an embodiment. Although FIG. 2B shows the triangular cross sections of the square bipyramids 200 as two equilateral triangles, the triangles may be non-equilateral and/or non-uniform relative to one another. An edge 204 of the bipyramid may be shared or joined with other pyramids or bipyramids.

Figure 3A:
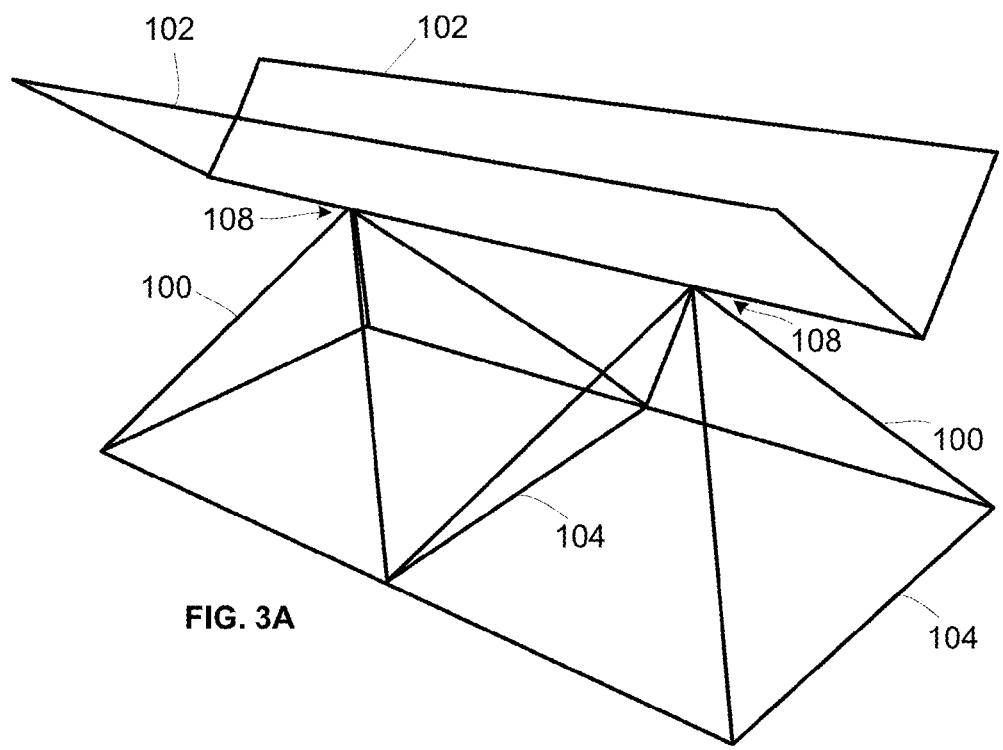
FIG. 3A shows a top perspective view of a space frame comprising a plurality of edge-sharing square pyramids having two planar structures extending from apexes of the pyramids in a V-shape, according to an embodiment.

FIG. 3A shows a top perspective view of a space frame comprising a plurality of edge-sharing square pyramids 100 having two planar structures 102 extending from apexes 108 of the pyramids 100 in a V-shape, according to an embodiment.

Figure 3B:
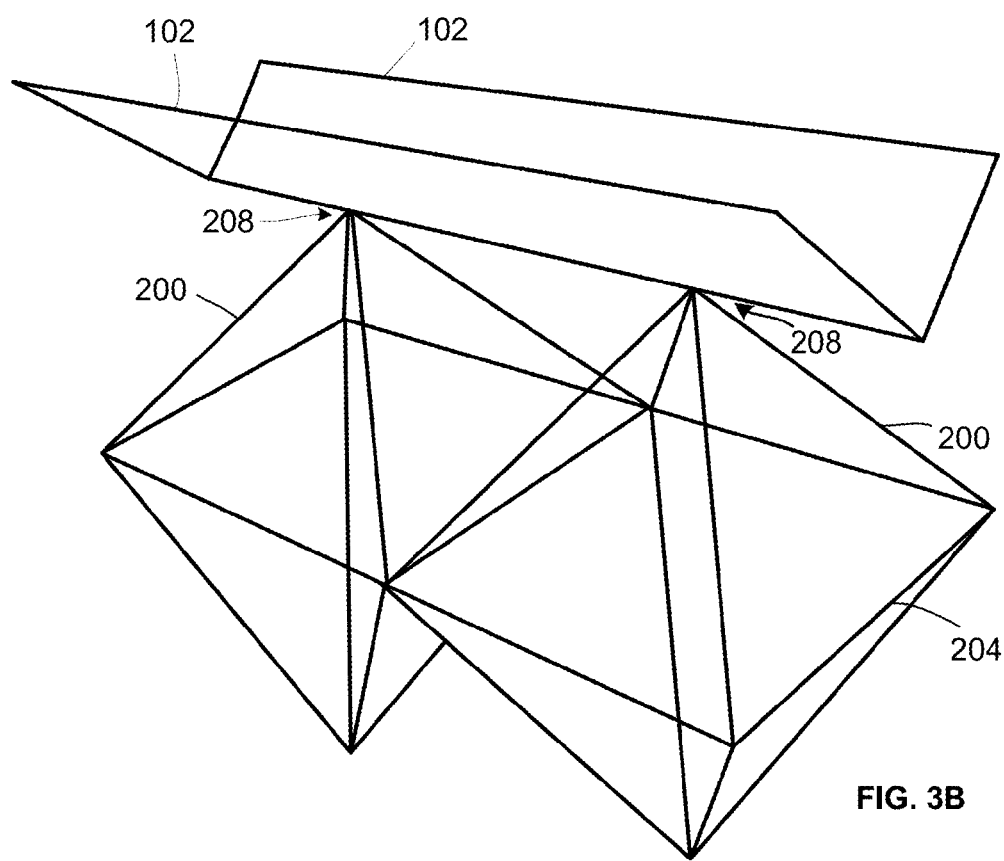
FIG. 3B shows a top perspective view of a space frame comprising a plurality of edge-sharing square bipyramids having two planar structures extending from apexes of the bipyramids in a V-shape, according to an embodiment.

FIG. 3B shows a top perspective view of a space frame comprising a plurality of edge-sharing square bipyramids 200 having two planar structures 102 extending from apexes 208 of the bipyramids 200 in a V-shape, according to an embodiment.

Figure 4:
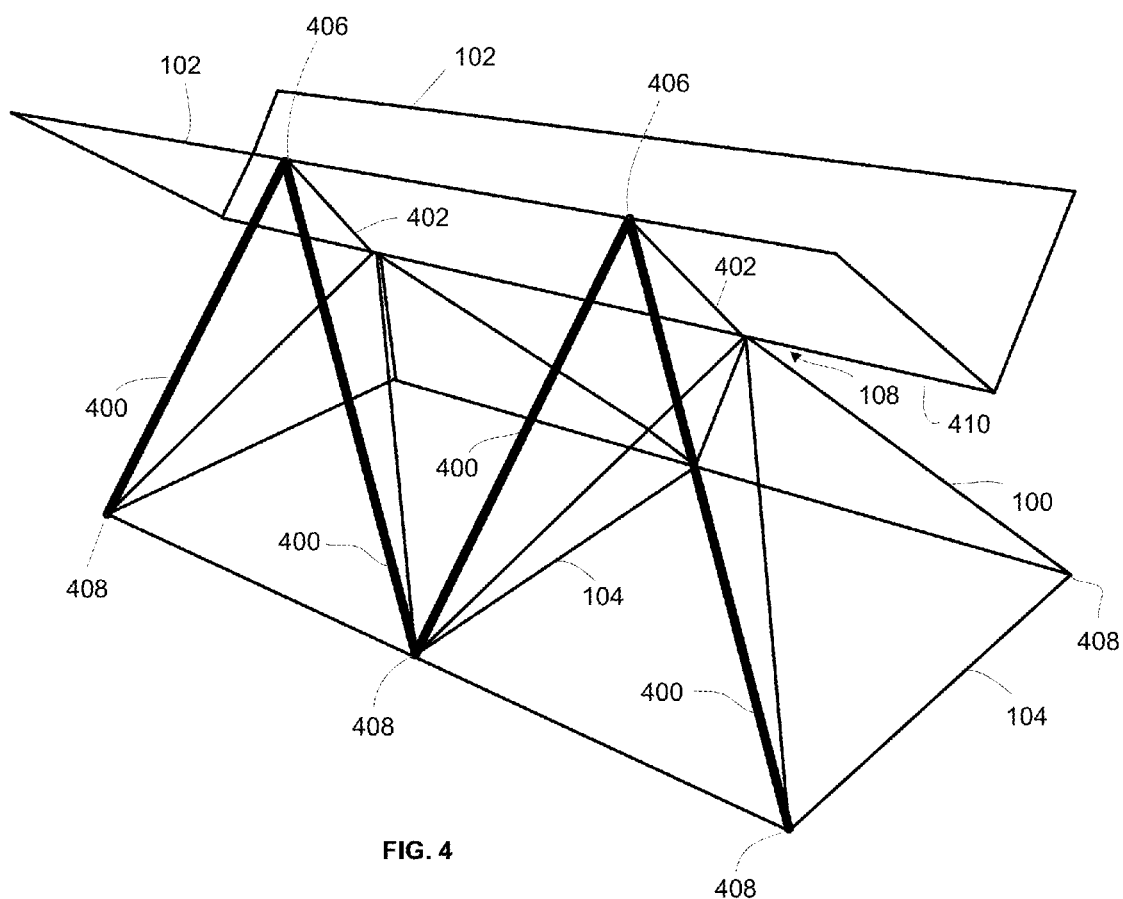
FIG. 4 shows a top perspective view of a space frame comprising a plurality of edge-sharing square pyramids having two planar structures extending from apexes of the pyramids in a V-shape, and further comprising apex struts and corner struts, according to an embodiment.

FIG. 4 shows a top perspective view of a space frame comprising a plurality of edge-sharing square pyramids 100 having two planar structures 102 extending from apexes 108 of the pyramids in a V-shape, and further comprising apex struts 402 and corner struts 400, according to an embodiment. (For clarity, apex struts 402 and corner struts 400 on the opposite face of each square pyramid 100 have been excluded from the figure.) Each apex strut 402 connects a node at the apex 108, e.g. on a main chord 410, to a node 406 disposed along a cross-sectional mid-point of the square pyramid and a top edge of each of the planar structures 102. Each corner strut 400 connects a node 406, disposed along a cross-sectional mid-point of the square pyramid and at a top edge of each of the planar structures 102, to corners 408 of the square pyramids 100. In an embodiment, square pyramids 100 are replaced by square bipyramids or octahedra, e.g. FIG. 2, 200.

Figure 5:
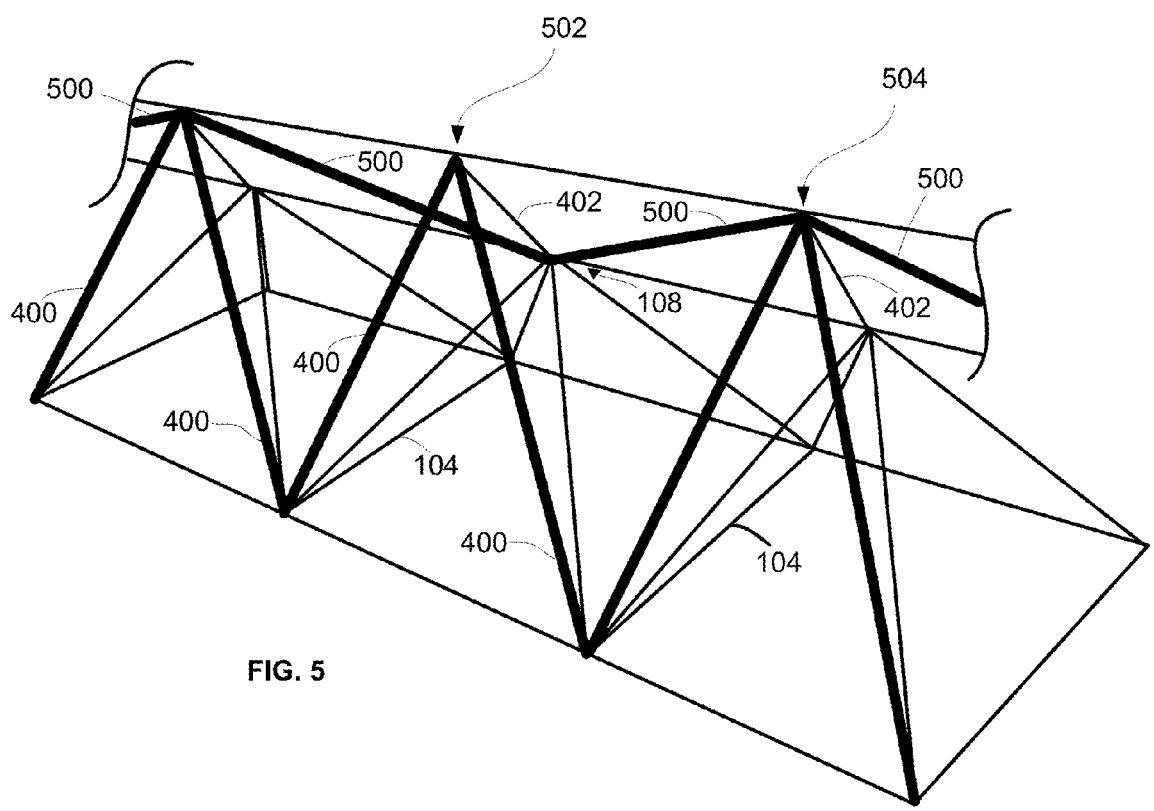
FIG. 5 shows a top perspective cut-away view of a space frame comprising a plurality of edge-sharing square pyramids having two planar structures extending from apexes of the pyramids in a V-shape, and further comprising apex struts, corner struts, and bridging struts, according to an embodiment.

FIG. 5 shows a top perspective view of a space frame comprising a plurality of edge-sharing square pyramids 100 having two planar structures 102 extending from apexes 108 of the pyramids 100 in a V-shape, and further comprising apex struts 402, corner struts 400, and bridging struts 500, according to an embodiment. (For clarity, one of the planar structures 102, apex struts 402, corner struts 400 and bridging struts 500 on the opposite face of each square pyramid 100 have been excluded from the figure.) Each bridging strut 500 connects a node at the apex 108, e.g. on a main chord 410, to a neighboring node 504 disposed along a cross-sectional mid-point of a neighboring square pyramid and a top edge of each of the planar structures 102. Neighboring node 504 facilitates at least five connections, while node 502 facilitates at least three connections. In an embodiment, nodes 502 and 504 alternate along a top edge of planar structures 102. In an embodiment, square pyramids 100 are replaced by square bipyramids or octahedra, e.g. FIG. 2, 200.

Figure 6A:
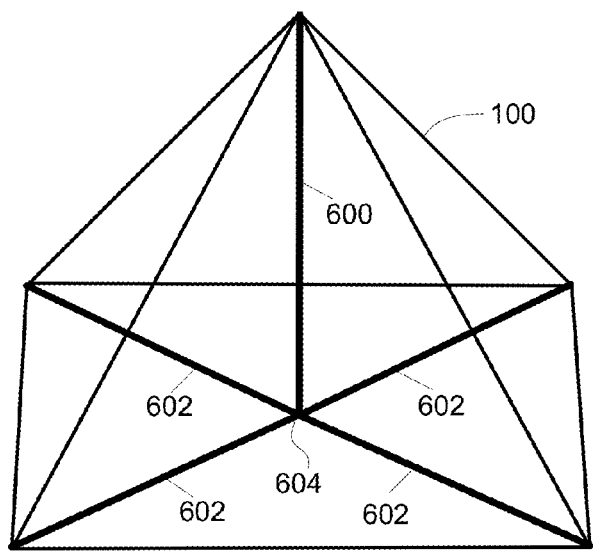
FIG. 6A shows a square pyramid having internal bracing struts, according to an embodiment.
Figure 6B:
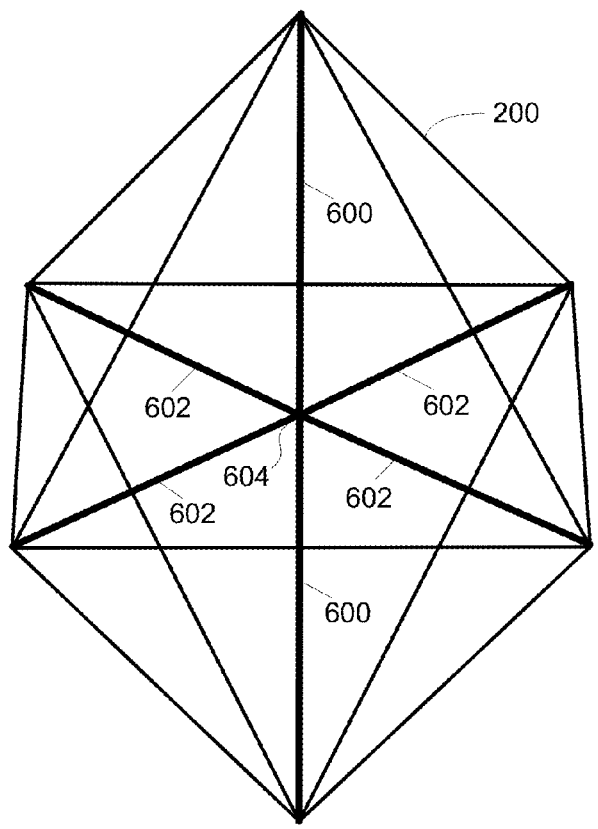
FIG. 6B shows a square bipyramid having internal bracing struts, according to an embodiment.

FIGS. 6A and 6B show a square pyramid 100 and a square bipyramid 200, respectively, having internal bracing struts including a vertical strut 600 and horizontal struts 602 that meet at an internal node 604. Internal bracing struts 600, 602 provide structural support for the square pyramid 100 or square bipyramid 200 and increase the overall strength of the space frame. Adding even one internal bracing strut improves the strength of the space frame. In embodiments comprising a single internal strut, no internal node is present.

Figure 7:
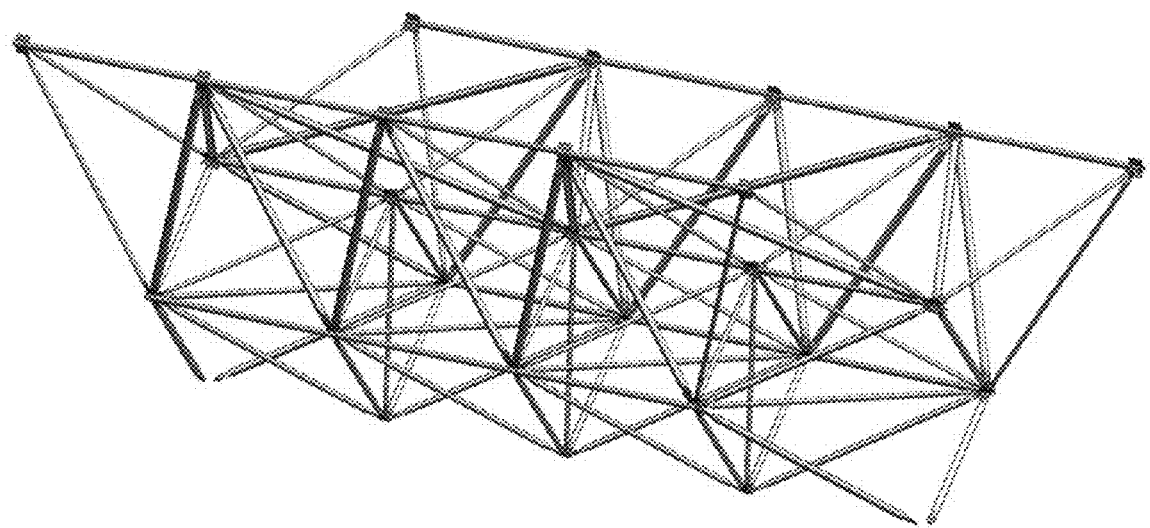
FIG. 7 provides an overview of a space frame comprising a pyramidal bottom truss, according to an embodiment.

FIG. 7 provides an overview of a space frame comprising a pyramidal bottom truss, according to an embodiment.

Figure 8:
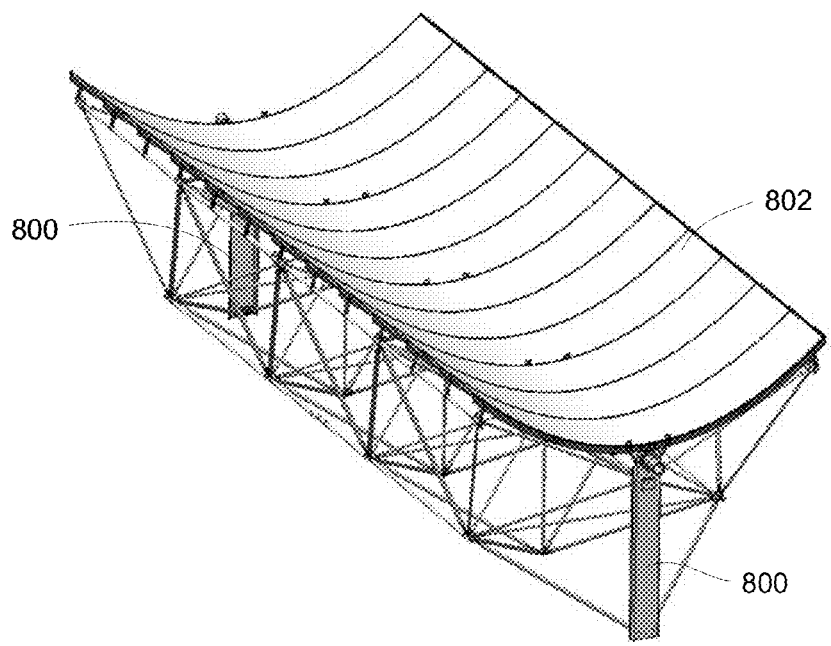
FIG. 8 provides an overview of a space frame supported by a pair of torque plates, according to an embodiment, having a solar reflector (e.g. mirror) disposed within the V-shape formed by the two planar structures.

FIG. 8 provides an overview of a space frame supported by a pair of torque plates 800 and having a solar reflector (e.g. mirror) 802 disposed within the V-shape formed by the two planar structures, according to an embodiment.

Figure 9:
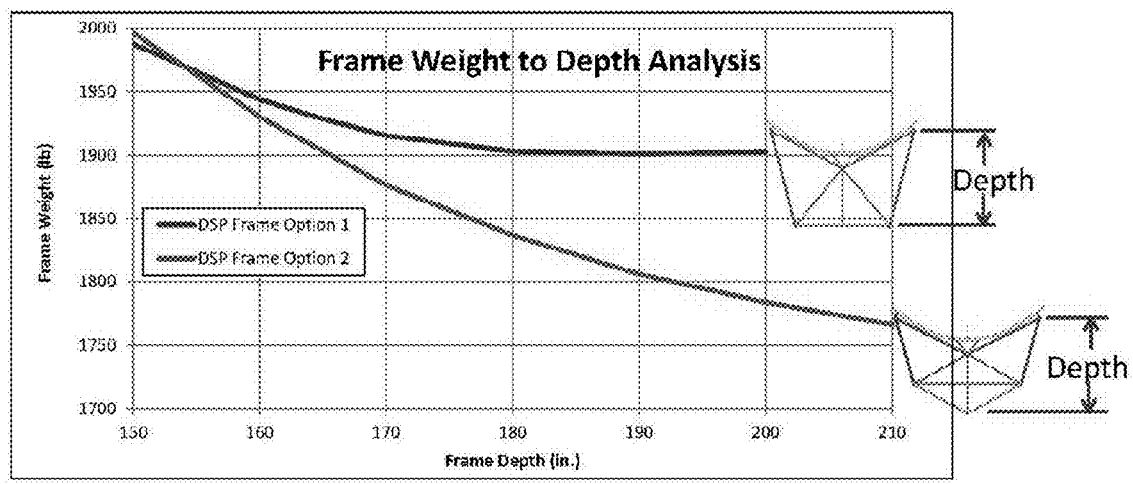
FIG. 9 shows a graph of frame depth versus frame weight for conventional space frames having planar bottom trusses (option 1) and for space frames having pyramidal bottom trusses (option 2).

FIG. 9 shows a graph of frame depth versus frame weight for conventional space frames having planar bottom trusses (option 1) and for space frames having pyramidal bottom trusses (option 2). In this analysis, different space frame geometries were simulated under a worst case loading scenario. Only the depth was changed for each simulation to determine how the weight of the frame responds to frame depth. This was done for various aperture widths ranging from 6 m to 10 m. The simulations indicated that a pyramidal space frame with the bottom truss out-of-plane (option 2) results in a more rapid decrease in weight as a function of depth and has a lower overall weight than the traditional planar bottom truss space frame geometry. While this chart indicates that as the depth of the frame continues to increase the total frame weight will continue to decrease, at a point beyond the extents of the graph the weight begins to increase. For this example, the optimum frame depth is between 210 and 220 inches, and space frames having a pyramidal bottom truss show a reduced weight relative to the conventional frame having a planar bottom truss at frame depths between about 160 inches and 220 inches.

Figure 10A:
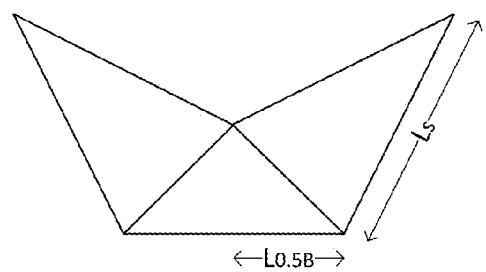
FIG. 10A shows a side plan view of a traditional space frame.
Figure 10B:
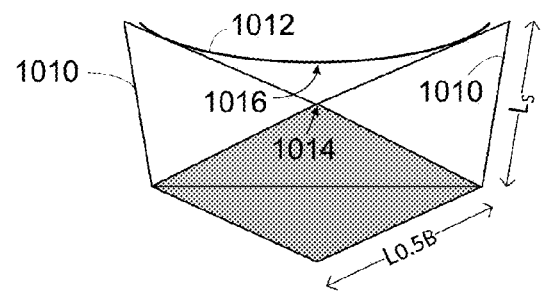
FIG. 10B shows a side plan views of the present space frame.

FIGS. 10A and 10B show side plan cross sectional views of a traditional space frame (A) and the present space frame (B). In each figure, half the length of a base strut is labeled as $L_{0.5B}$ and the length of a side strut is labeled as $L_S$. In addition, the present space frame (B) shows a diamond-shaped cross section as a shaded portion and a pair of wings or triangles 1010 that extend from a top of the diamond. In an embodiment, the space frame supports a solar concentrator 1012 and an apex 1014 of the diamond is pointed toward a vertex 1016 of the solar concentrator.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a strut" includes a plurality of such struts and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing-herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

We claim:

1. A concentrating solar power (CSP) system comprising:
   a space frame comprising:
   a plurality of edge-sharing octahedra configured linearly, wherein each octahedron comprises an apex at a node on a main chord; and
   two longitudinal top chords disposed above the octahedra, wherein the top chords are connected to the octahedra by apex struts joining nodes on the top chords to the nodes on the main chord and by corner struts joining the nodes on the top chords to nodes at each corner of each octahedron; and
   a parabolic solar reflector disposed within the "V" shape formed by the main chord and the top chords.

2. The CSP system of claim 1, wherein the parabolic solar reflector is a contiguous solar reflector.

3. The CSP system of claim 1, wherein a depth of the space frame is selected from the range of 3 meters to 5 meters.

4. The CSP system of claim 1 further comprising bridging struts joining the nodes on the top chords to the nodes on the main chord corresponding to the apexes of neighboring octahedra.

5. The CSP system of claim 1, wherein each octahedron comprises one or more internal bracing struts.

6. The CSP system of claim 1, wherein an aperture of the "V" shape is selected from the range of 1 meter to 12 meters.

7. The CSP system of claim 1, wherein an aperture of the "V" shape is at least 6 meters.

8. The CSP system of claim 1, wherein a ratio of an aperture of the "V" shape to a depth of the space frame is selected from the range of 1.25 to 4.25.

9. The CSP system of claim 1, wherein the "V" shape has an internal angle selected from the range of 110 degrees to 170 degrees.

* * * * *